April 15, 1930.  G. NEWELL  1,754,567
FISHING GEAR
Filed Sept. 26, 1927
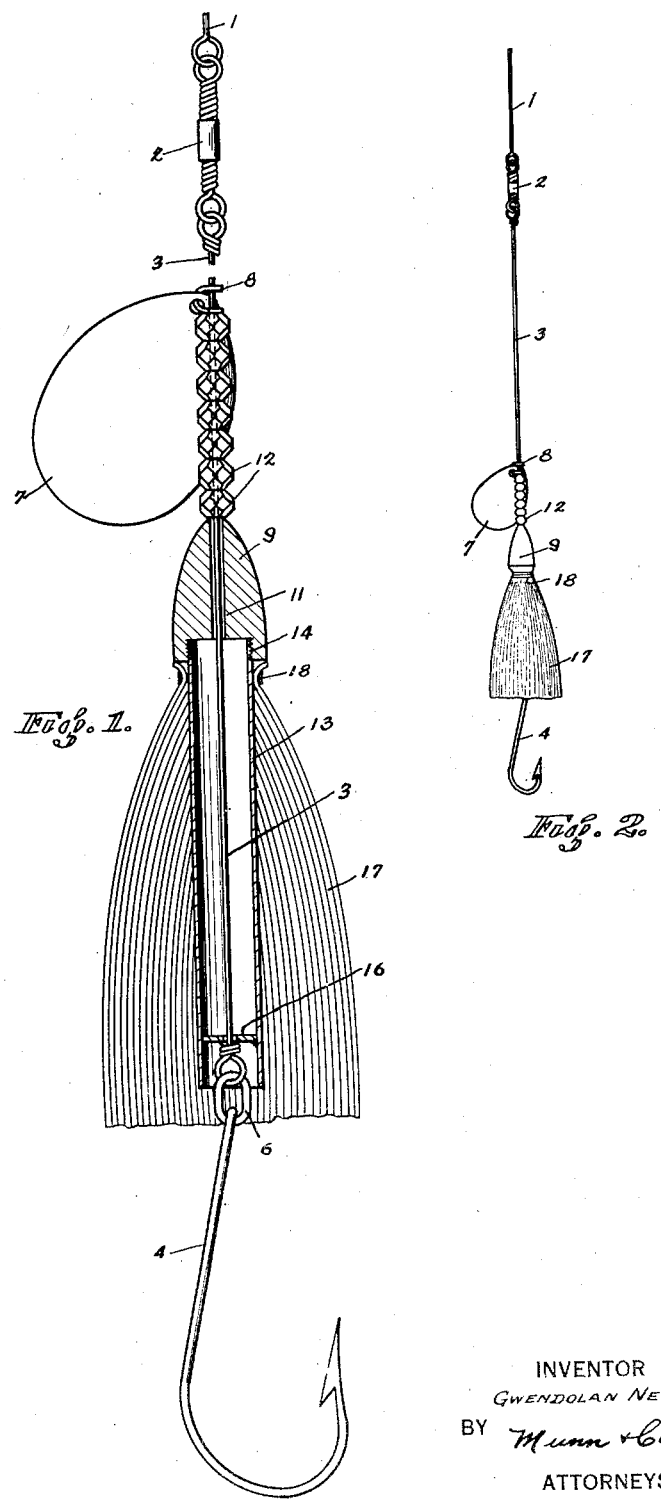
INVENTOR
GWENDOLAN NEWELL
BY Munn & Co.
ATTORNEYS Patented Apr. 15, 1930

1,754,567

UNITED STATES PATENT OFFICE

GWENDOLAN NEWELL, OF SAN FRANCISCO, CALIFORNIA

FISHING GEAR

Application filed September 26, 1927. Serial No. 222,067.

The present invention relates to improvements in fishing gear, and the principal object of the invention is to provide a fishing gear in which one or more attractors are disposed slidably relative to a fishing hook so that when the hook is drawn on by a fish the attractors may freely recede for the purpose of freeing the hook and of facilitating the landing of the fish. A further object of the invention is to provide a novel type of attractor particularly adapted to lure the fish. Another object of the invention is to provide a combination sinker and attractor particularly effective in connection with a fishing gear. A further object of the invention is to provide a novel means for mounting a spinner relative to a fishing gear. A further object is to arrange two kinds of attractors in a single fishing gear in such a manner that the same remain in spaced relation and are freely slidable relative to the fishing hook.

Further objects and advantages of my invention will appear as the specification proceeds.

The form of my invention is illustrated in the accompanying drawings, in which:

Figure 1 shows my fishing gear partly in elevation and partly in longitudinal section, and Figure 2 a side elevation of my fishing gear on a reduced scale.

While I have shown only the preferred form of the invention, I wish to have it understood that various changes or modifications may be made within the scope of the claims hereto attached without departing from the spirit of the invention.

In its preferred form my fishing gear comprises a line 1 of which only a small part is shown, a swivel 2 of any conventional form attached thereto, a wire 3 commonly referred to as a leader attached to the free end of the hook 4 by means of a ring 6, and various attractors slidable on the leader.

The attractors comprise a spoon or spinner 7 swiveled to a clevice 8, which latter has its arms pivoted to the leader with freedom of sliding motion, a sinker 9 of any suitable form perforated as shown at 11 to slide on the leader 3 with freedom of revolving motion and a plurality of spacing elements 12 preferably made in the form of beads of highly attractive coloring interposed between the spinner and the sinker.

The sinker has a tube 13 of considerable length threaded into the lower end thereof as shown at 14 in such a manner that the tube encircles the leader and a disc 16 is secured in the lower end of the tube so as to maintain the latter in substantially concentric relation with the leader. This disc 16 also serves the purpose of preventing the hook from sliding into the tube and from binding therein.

A tail 17 consisting of a plurality of strands of yarn or similar material suitably colored, is fastened relative to the sinker on the tube 13 by means of a thread of silk 18 or other material wrapped around the upper end thereof so that the bushy end of the tail encircles and hides the tube.

The advantages of the construction of my fishing gear will be readily understood from the foregoing description. The fish lure in the form of the various attractors slides freely on the leader so as to clear the hook once a bite has been secured so that the attractors interfere in no way with the successful landing of the fish and there is no chance of the attractors becoming lost. The tube 13 forming a part of the sinker is prevented from sliding downwardly over the end of the hook by means of the disc 16. The spinner is slidably movable relative to the leader and assumes a natural position, acting as a reflector for attracting the fish. The beads maintain the spinner and the sinker in spaced relation and being colored also tend to attract and lure the fish.

I claim:

1. In a fishing gear of the character described a leader for a fish hook having a sinker slidable thereon, a spacing tube extending from the sinker toward the hook in encircling relation to the leader, a stop limiting the sliding movement of the tube relative to the hook and a tail of attractive material extending from the sinker in encircling relation to the tube but clearing the hook.

2. In a fishing gear of the character described, a leader for a fish hook having a sinker slidable thereon, a spoon slidable on the leader above the sinker, a plurality of beads slidable on the leader between the spoon and the sinker for spacing the same and attracting the fish, a spacing tube extending from the sinker toward the hook in encircling relation to the leader, a stop limiting the sliding movement of the tube relative to the hook and a tail of attractive material extending from the sinker in encircling relation to the tube but clearing the hook.

GWENDOLAN NEWELL.